(No Model.)

J. D. LUCAS.
BUTTER DISH.

No. 296,293. Patented Apr. 1, 1884.

WITNESSES.
W. J. Graham
C. C. Baldwin

INVENTOR.
Joseph D. Lucas
by Donald C. Ridout & Co.
Attys.

UNITED STATES PATENT OFFICE.

JOSEPH D. LUCAS, OF TORONTO, ONTARIO, CANADA.

BUTTER-DISH.

SPECIFICATION forming part of Letters Patent No. 296,293, dated April 1, 1884.

Application filed February 18, 1884. (No model.) Patented in Canada March 6, 1884, No. 18,803.

*To all whom it may concern:*

Be it known that I, JOSEPH DONTIGNY LUCAS, of the city of Toronto, in the county of York, in the Province of Ontario, Canada, silver-plater, have invented certain new and useful Improvements in the Construction of Butter or other Similar Dishes; and I do hereby declare that the following is a full, clear, and exact description of the same.

The object of the invention is to devise a simple, cheap, and yet ornamental dish provided with a handle and other appointments; and it consists, essentially, in providing a metal ring designed to fit the circumference of the dish, and provided with claws designed to grasp the edge of the dish, the said ring being preferably drawn together by a set-screw or other clamping device to cause it to grasp the rim of the dish, as hereinafter more particularly explained and shown.

Figure 1:
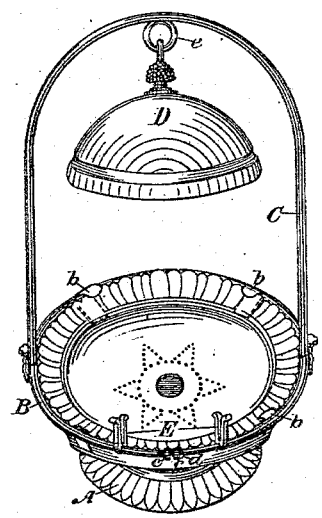
Figure 2:
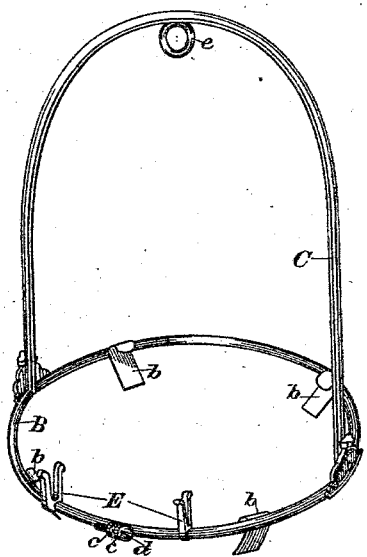

Figure 1 is a perspective view of a butter-dish made in accordance with my invention. Fig. 2 is a perspective view of the metal ring and handle.

A is a dish of any suitable design and of any material, although I consider it preferable to make it of glass.

B is a ring, preferably made of a piece of wire, and provided with claws *b*, designed to fit over and grasp the edge of the dish A. It will be noticed that the ring B is divided, the ends on either side of the division being provided with lugs *c*, having holes pierced through them and screwed to receive the set-screw *d*. This set-screw is designed to draw together the ends of the wire forming the ring B, in order that the said ring may be brought in contact with the circumference of the glass dish A, the claws *b* fitting over and grasping the edge of the dish, so as to fasten the ring securely onto the same.

C is a handle, of any suitable design, and fastened to the ring B. This handle has a ring, *e*, fixed to and extending downwardly from its top in order to permit the cover D to be suspended, as indicated in Fig. 1.

In addition to the handle, which is fixed to the ring, as specified, I provide, when the dish is to be used for butter, a knife-holder, E, which is fastened to and designed to form part of the ring B.

I do not wish it to be inferred that the ring B must necessarily be round, as it of course would accomplish its purpose if it were made oval, or, indeed, any shape, so long as it conformed to the shape of the edge of the dish upon which it is intended to be clasped.

What I claim as my invention is—

1. In combination with a dish of any suitable design, a divided ring, B, designed to fit the edge of the dish, and provided with claws *b*, arranged to grasp the edge of the dish when the ends of the divided ring are clamped together, as specified.

2. A divided ring, B, having the knife-holder E, handle C, and claws *b*, attached to it, in combination with lugs *c*, formed on the ends of the ring and clamped together, substantially as and for the purpose specified.

Toronto, February 2, 1884.

J. D. LUCAS.

In presence of—
CHAS. C. BALDWIN,
W. I. GRAHAM.